United States Patent
Liao

(10) Patent No.: US 10,572,429 B2
(45) Date of Patent: Feb. 25, 2020

(54) PORT EXTENSION APPARATUS

(71) Applicant: Gopod Group Ltd., Shenzhen/Guangdong (CN)

(72) Inventor: Zhuowen Liao, Shenzhen (CN)

(73) Assignee: Gopod Group Ltd. (CN)

( * ) Notice: Subject to any disclaimer, the term of this patent is extended or adjusted under 35 U.S.C. 154(b) by 24 days.

(21) Appl. No.: 15/938,055

(22) Filed: Mar. 28, 2018

(65) Prior Publication Data

US 2018/0314664 A1 Nov. 1, 2018

(30) Foreign Application Priority Data

Apr. 27, 2017 (CN) .................... 2017 2 0462506 U

(51) Int. Cl.
G06F 13/40 (2006.01)
G06F 13/38 (2006.01)

(52) U.S. Cl.
CPC ........ G06F 13/4068 (2013.01); G06F 13/387 (2013.01); G06F 13/405 (2013.01); *G06F 2213/0042* (2013.01)

(58) Field of Classification Search
CPC ... G06F 13/4022; H04B 1/406; H04B 1/3883; H04N 21/4183
See application file for complete search history.

(56) References Cited

U.S. PATENT DOCUMENTS

| | | | | |
|---|---|---|---|---|
| 6,650,649 B1 * | 11/2003 | Muhammad | ........... | H04B 1/406 370/402 |
| 8,959,272 B2 | 2/2015 | Lamm et al. | | |
| 2003/0041205 A1 * | 2/2003 | Wu | ........ | G06F 3/0227 710/302 |
| 2003/0151885 A1 * | 8/2003 | Chang | ................. | G06F 13/4022 361/600 |
| 2007/0252605 A1 * | 11/2007 | Heisler | .................. | H04L 43/50 324/755.01 |
| 2011/0317076 A1 * | 12/2011 | Chen | .................. | H04N 21/4183 348/705 |

(Continued)

FOREIGN PATENT DOCUMENTS

CN 204179435 U 2/2015
CN 205159722 U 4/2016

(Continued)

*Primary Examiner* — Getente A Yimer

(57) ABSTRACT

Port extension apparatus for providing better usage and utilization efficiency ports of end-user devices are disclosed. Port extension apparatus includes at least a main port module for connection to end-user device, first data port module, data transmission control module, second data port module, and video port module. When a to-be-connected device connects to the first data port module, the first data port module and the main port module form a transmission path enabling data transmission between the to-be-connected device and the end-user device. When the to-be-connected device connects to the second data port module, the data transmission control module controls the data transmission between the to-be-connected device and the end-user device. When the to-be-connected device connects to the video port module, the data transmission control module receives the to-be-displayed information from the end-user device and transmits to the to-be-connected device to display.

17 Claims, 2 Drawing Sheets

(56) References Cited

U.S. PATENT DOCUMENTS

2014/0013024 A1   1/2014   Lamm et al.
2016/0308569 A1*  10/2016  Wei .................... H04B 1/3883

FOREIGN PATENT DOCUMENTS

| CN | 205378079 U | 7/2016 |
| CN | 205427837 U | 8/2016 |
| CN | 106025742 A | 10/2016 |
| CN | 106339348 A | 1/2017 |
| CN | 206135140 U | 4/2017 |

* cited by examiner

PORT EXTENSION APPARATUS

FIELD

The invention generally relates to electronic technology field and, more particularly, to port extension apparatus.

BACKGROUND

With the popularization of end-user devices (e.g. mobile phone, tablet computer, and portable computer, etc.), they have become indispensable from people's life and work environment.

Ports (e.g., headphone jack, USB (Universal Serial Bus) ports or USB Type-C ports) are provided in current end-user devices for connecting to other devices. However, due to the limited size of an end-user device, only a few ports can be provided. Also, the space between the ports provided is relatively tight. When a port in an end-user device is in use to connect to a particular device, due to the volume of the particular device or the size of the connector of the particular device being physically too big, other ports in the end-user device can easily become inaccessible for connecting another device.

As described above, there are low and/or inefficient port usage problems existed in current end-user devices.

BRIEF SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Port extension apparatus used with end-user devices for resolving low and/or inefficiency port usage problems in end-user devices are disclosed.

One object of the port extension apparatus is to provide extension of ports of an end-user device to other to-be-connected devices. According to one example embodiment of the disclosure, a port extension apparatus includes a main port module for connecting to the end-user device, a first data port module, a data transmission control module, a second data port module, and a video port module.

Data transmission port of the first data port module is connected to the first end of the main port module. First data transmission port of the data transmission control module is connected to the second end of the main port module. Data transmission port of the second data port module is connected to the second data transmission port of the data transmission control module. Data transmission port of the video port module is connected to the third data transmission port of the data transmission control module.

When a to-be-connected device is connected to the port extension apparatus via the first data port module, the first data port module and the main port module become a transmission path. It enables data transmission between the to-be-connected device and the end-user device.

When a to-be-connected device is connected to the port extension apparatus via the second data port module, the data transmission control module controls data transmission between the to-be-connected device and the end-user device.

When a to-be-connected device is connected to the port extension apparatus via the video port module, the data transmission control module receives the to-be-displayed information from the end-user device and transmits the to-be-displayed information to the to-be-connected device to display.

According to one example embodiment, a port extension apparatus includes at least a main port module for connection to end-user device, first data port module, data transmission control module, second data port module, and video port module. When a to-be-connected device connects to the first data port module, the first data port module and the main port module form a transmission path enabling data transmission between the to-be-connected device and the end-user device. When the to-be-connected device connects to the second data port module, the data transmission control module controls the data transmission between the to-be-connected device and the end-user device. When the to-be-connected device connects to the video port module, the data transmission control module receives the to-be-displayed information from the end-user device and transmits to the to-be-connected device to display. This increases the utilization efficiency of the end-user device port.

BRIEF DESCRIPTION OF THE DRAWINGS

These and other features, aspects, and advantages of the invention will be better understood with regard to the following description, appended claims, and accompanying drawings as follows:

DETAILED DESCRIPTION

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
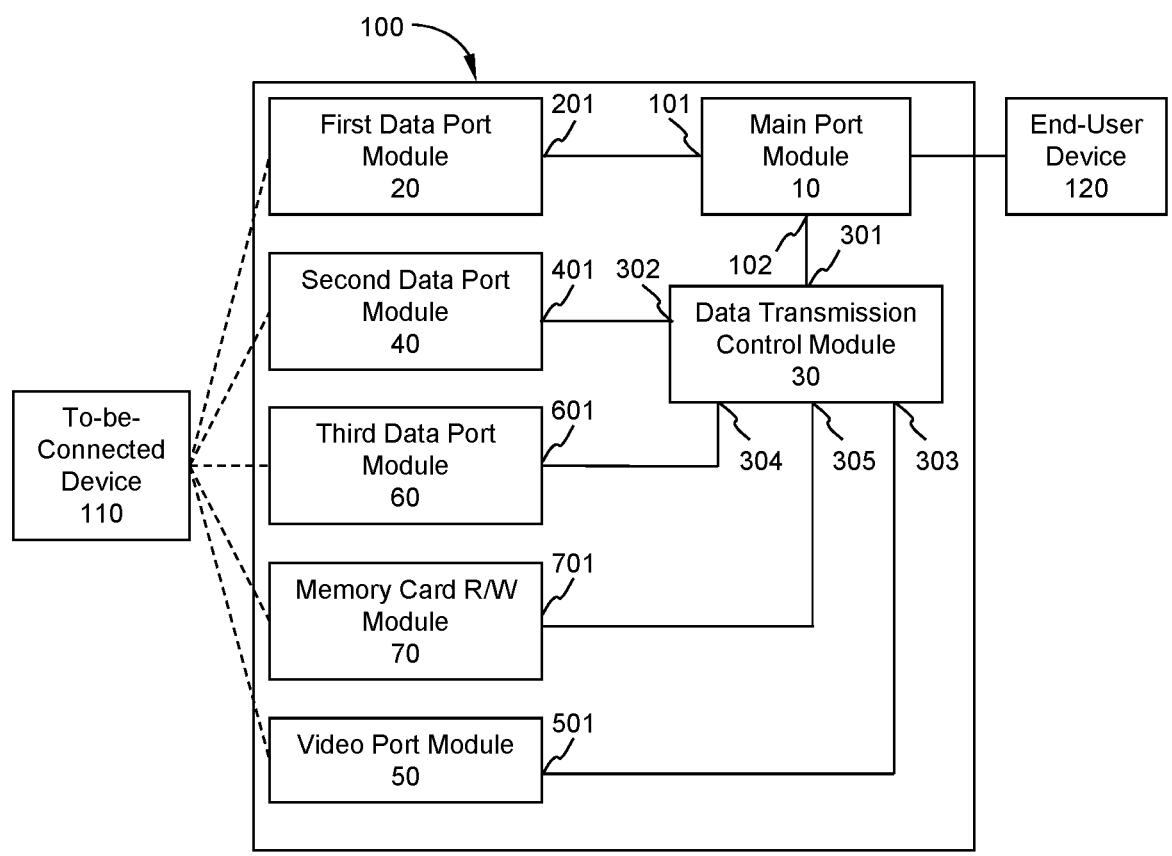
FIG. 1 is a diagram showing an example port extension apparatus in accordance with one embodiment of the invention.
Figure 2:
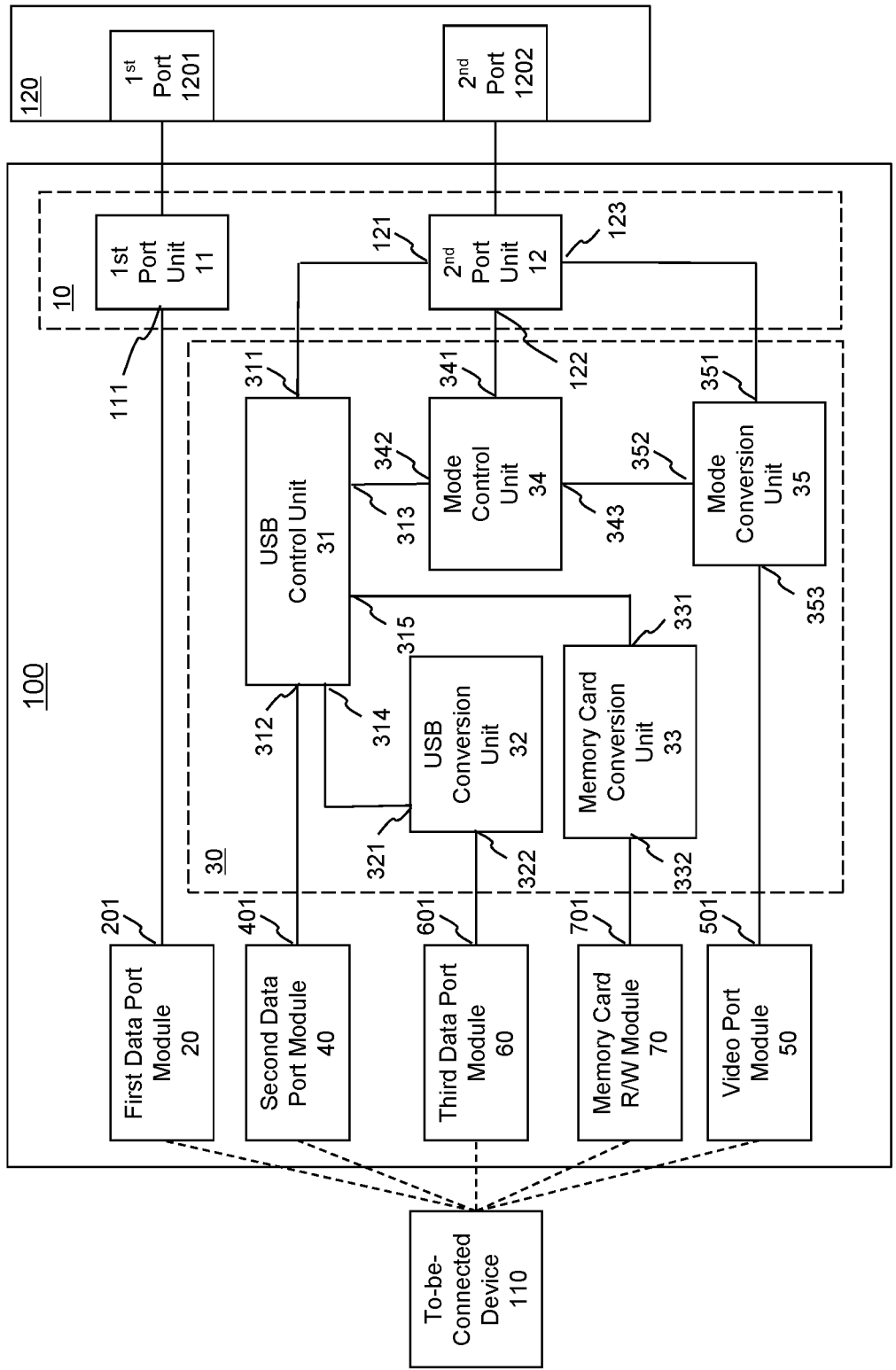
FIG. 2 is a functional diagram illustrating an example port extension apparatus in accordance with one embodiment of the invention.

Embodiments of the invention are discussed herein with reference to FIG. 1 and FIG. 2. However, those skilled in the art will readily understand and appreciate that the detailed descriptions given herein with respect to these figures is for explanatory purposes as the invention extends beyond these limited embodiments.

Detailed descriptions below are to explain one implementation of an example port extension apparatus for resolving low and/or inefficient port usage problems existed in current end-user devices.

FIG. 1 is a diagram showing the structure of an example port extension apparatus. For illustration simplicity, only relevant portions are shown.

According to one embodiment of the invention, a port extension apparatus 100 is provided for allowing to-be-connected devices 110 to connect to data ports of an end-user device 120.

As shown in FIG. 1, a port extension apparatus 100 includes a main port module 10 for connecting to ports of the end-user device 120, a first data port module 20, a data transmission control module 30, a second data port module 40, a video port module 50, a third data port module 60 and a memory card R/W (Read/Write) module 70.

Data transmission port 201 of the first data port module 20 connects to the first end 101 of the main port module 10. First data transmission port 301 of the data transmission control module 30 connects to the second end 102 of the main port module 10. Data transmission port 401 of the second data port module 40 connects to the second data transmission port 302 of the data transmission control module 30. Data transmission port 501 of the video port module 50 is connected to the third data transmission port 303 of the data transmission control module 30.

When the to-be-connected device 110 connects to the port extension apparatus 100 via the first data port module 20, the first data port module 20 and the main port module 10 form a transmission path between the to-be-connected device 110 and the end-user device 120.

When the to-be-connected device 110 connects to the port extension apparatus 100 via the second data port module 40, the data transmission control module 30 controls the data transmission between the to-be-connected device 110 and the end-user device 120.

When the to-be-connected device 110 connects to the port extension apparatus 100 via the video port module 50, the data transmission control module 30 receives instructions from the end-user device 120 with to-be-displayed information; and further transmits the to-be-displayed information to the to-be-connected device 110 to display.

The end-user device 120 can be a mobile phone, a tablet, or a portable computer.

In all embodiments, when the to-be-connected device 110 connects to the first data port module 20, data directly transmits between the first data port module 20 and the end-user device 120 via main port module 10.

Different from the first data port module 20, when the to-be-connected device 110 connects to other port modules (e.g., the second data port module 40, the video port module 50), data transmission needs to pass through the data transmission control module 30 between the to-be-connected device 110 and the end-user device 120.

Accordingly, those having ordinary skill in the art would understand that the to-be-connected devices 110 are connected to the end-user device 120 via wired connection. For example: USB flash drive, mobile phone, or display device.

In one embodiment, the first data port module 20, the second data port module 40, and the video port module 50 are connected to different to-be-connected devices 110 simultaneously and transmit data to the end-user device 120 at the same time.

As shown in FIG. 1, the port extension apparatus 100 also includes the third data port module 60 and a memory card R/W port module 70.

The third data port module 60 connects to the fourth data transmission port 304 of the data transmission control module 30. The memory card read/write port module 70 connects to at least one data read/write port 305 of the data transmission control module 30.

When the to-be-connected device 110 is a memory card, the memory card connects to the port extension apparatus 100 via the memory card R/W port module 70 and the data transmission control module 30. As a result, the end-user device 120 can transmit data to the memory card.

FIG. 2 is a function diagram showing an example port extension apparatus. As shown in FIG. 2, main port module 10 includes a first port unit 11 and a second port unit 12.

Device connection port 111 of the first port unit 11 is the first end 101 of the main port module 10 as shown in FIG. 1. Device connection ports 121-123 of the second port unit 12 form the second end 102 of the main port module 10 in FIG. 1.

When the to-be-connected device 110 connects to the first data port module 20 and the first port unit 11, the first data port module 20 and the first port unit 11 form a physical transmission path.

As shown in FIG. 2, data transmission control module 30 includes USB control unit 31, USB conversion unit 32, memory card conversion unit 33, mode control unit 34, and mode conversion unit 35.

The first data transmission port 301 of the data transmission control module 30 comprise the first data port 311 of the USB control unit 31, the first data port 341 of the mode control unit 34, and the first data port 351 of the mode conversion unit 35.

The second data port 312 of the USB control unit 31 is the second data transmission port 302 of the data transmission control module 30.

The third data port 313 of the USB control unit 31 connects to the second data port 342 of the mode control unit 34. The third data port 343 of the mode control unit 34 connects to the second data port 352 of the mode conversion unit 35. The third data port 353 of the mode conversion unit 35 is the third data transmission port 303 of the data transmission control module 30.

The fourth data port 314 of the USB control unit 31 connects to the first data port 321 of the USB conversion unit 32. The second data port 322 of the USB conversion unit 32 is the fourth data transmission port 304 of the data transmission control module 30.

The fifth data port 315 of the USB control unit 31 connects to one of the multiple data transmission ports 331-332 of the memory card conversion unit 33. The memory card conversion unit 33 includes multiple data transmission ports 331-332. Multiple data transmission ports 331-332 make up the at least one data read/write port 305 of the data transmission control module 30.

In one embodiment, video port module 50 includes, but is not limited to, a VGA (Video Graphics Array) port, a DVI (Digital Visual Interface) port, an HDMI (High-Definition Multimedia Interface) port, a Mini DP (Mini DisplayPort) or a DP (DisplayPort).

For those having ordinary skill in the art would understand that VGA port, DVI port, HDMI port, Mini DP port, and DP port are current technologies. The invention extends to future video ports.

For example, when the to-be-connected device 110 is a display device, the to-be-connected device 110 connects to port extension apparatus 100 via the video port module 50; enabling data transmission with the end-user device 120. End-user device 120 transmits to-be-displayed information (data and/or instructions) to the mode control unit 34. The mode control unit 34 controls the mode conversion unit 35 to convert the to-be-displayed information to the proper format for the display device to display.

In one embodiment, the first data port module 20 is for a Type-C (USB Type-C) female port or a Lightning female port.

For example, when the to-be-connected device 110 is a mobile phone and the end-user device 120 is a computer, the mobile phone 110 and computer 120 transmits data or performs a power charge directly through the transmission path created by the first data port module 20 and the main port module 10.

In another embodiment, the second data port module 40 is for a USB female port.

For example, when the to-be-connected device 110 is a USB flash drive and the end-user device 120 is a computer, the USB flash drive connects to the port extension apparatus 100 via the second data interface port 40; USB control unit 31 controls the data transmission between the USB flash drive and the computer.

In yet another embodiment, the third data port module is for a Type-C female port or a Lightning female port.

For example, when the to-be-connected device 110 is a mobile phone and the end-user device 120 is a computer, the mobile phone connects to the port extension apparatus 100 through the third data port module 60. The USB control unit 31 controls the data transmission between the mobile phone and the computer; or through the control of the USB mode conversion unit 32 to charge the mobile phone.

In still another embodiment, the first port unit 11 is a Type-C male port or a USB male port. In still another embodiment, the second port unit 12 is a Type-C male port or a USB male port.

As shown in FIG. 2, it is understood that when the first port 1201 and the second port 1202 of the end-user device 120 are both Type-C female ports, the first port unit 11 and second port unit 12 of the main port module 10 are Type-C male ports. When the first port 1201 and the second port 1202 of the end-user device 120 are both USB female ports, the first port unit 11 and second port unit 12 of the main port module 10 are USB male ports.

In conjunction with FIG. 2, various functions of the port extension apparatus 100 are explained below.

As shown in FIG. 2, when the to-be-connected device 110 connects to the port extension apparatus 100 via the first data port module 20, the first data port module 20 and the first port unit 11 of the main port module 10 form a transmission path; enabling direct data transmission between the to-be-connected device 110 and the end-user device 120 via the transmission path.

When the to-be-connected device 110 connects to the port extension apparatus 100 via the second data port module 40, the USB control unit 31 controls the data transmission between the to-be-connected device 110 and the end-user device 120.

When the to-be-connected device 110 connects to the port extension apparatus 100 via the video port module 50, the mode control unit 34 of the data transmission module 30 receives the to-be-displayed information (i.e., data and/or instructions) from the end-user device 120. If the to-be-displayed information needs mode conversion, the mode conversion unit 35 converts the conversion the to-be-displayed information to the proper format for the to-be-connected device 110 to display. If the to-be-displayed information does not need any mode conversion, the to-be-displayed information will be directly delivered to the to-be-connected device 110 to display.

For example, when the to-be-connected device 110 is a display device, the to-be-connected device 110 connects to the port extension apparatus 100 via the video port module 50; enabling data transmission with the end-user device 120. Simultaneously, when the mode control unit 34 detects connection between the to-be-connected device 110 and the video port module 50, the mode control unit 34 transmits the format information of the display device to the end-user device 120 via the second port unit 12. The end-user device 120 then sends the to-be-displayed information to the mode conversion unit 35. The mode conversion unit 35 converts the to-be-displayed information to the proper format (e.g., converting DP format to HDMI format) before transmitting to the to-be-connected device 110 to display.

When the to-be-connected device 110 is a memory card, the memory card connects to the port extension apparatus 100 via the memory card R/W module 70. The end-user device 120 sends control instructions to the port extension apparatus 100 via the control of the USB control unit 31. Data transmission (i.e., read/write) are then performed by the memory card conversion unit 33 with the memory card.

According to one example embodiment, a port extension apparatus includes at least a main port module for connection to end-user device, first data port module, data transmission control module, second data port module, and video port module. When a to-be-connected device connects to the first data port module, the first data port module and the main port module form a transmission path enabling data transmission between the to-be-connected device and the end-user device. When the to-be-connected device connects to the second data port module, the data transmission control module controls the data transmission between the to-be-connected device and the end-user device. When the to-be-connected device connects to the video port module, the data transmission control module receives the to-be-displayed information from the end-user device and transmits to the to-be-connected device to display. This increases the utilization efficiency of the end-user device port.

Although the invention has been described with reference to specific embodiments thereof, these embodiments are merely illustrative, and not restrictive of, the invention. Various modifications or changes to the specifically disclosed example embodiments will be suggested to persons skilled in the art. In summary, the scope of the invention should not be restricted to the specific example embodiments disclosed herein, and all modifications that are readily suggested to those of ordinary skill in the art should be included within the spirit and purview of this application and scope of the appended claims.

I claim:

1. A port extension apparatus for extending ports of an end-user device comprising:
   a main port module for connecting to an end-user device, the main port module having first and second port units;
   a first data port module operatively connecting to the first port unit;
   a data transmission control module operatively connecting to the second port unit via a first data transmission port of the data transmission control module;
   a second data port module operatively connecting to a second data transmission port of the data transmission control module; and
   a video port module operatively connecting to a third data transmission port of the data transmission control module; wherein
   when a to-be-connected device connects to the first data port module, the first data port module and the main port module form a transmission path enabling data transmission between the to-be-connected device and the end-user device;
   when a to-be-connected device connects to the second data port module, the data transmission control module controls data transmission between the to-be-connected device and the end-user device; and when a to-be-connected device connects to the video port module, the data transmission control module receives the to-be-displayed information from the end-user device to the to-be-connected device to display.

2. The port extension apparatus as described in claim 1, further comprising:

a third data port module operatively connecting to a fourth data transmission port of the data transmission control module; and a memory card R/W (read/write) module operatively connecting to at least one data read/write port of the data transmission control module.

3. The port extension apparatus as described in claim 2, wherein the to-be-connected device comprises a memory card, which connects to the end-user device via the memory card R/W module and the data transmission control module.

4. The port extension apparatus as described in claim 2, wherein the data transmission control module comprises a USB (Universal Serial Bus) control unit, a USB conversion unit, a memory card conversion unit, a mode control unit and a mode conversion unit.

5. The port extension apparatus as described in claim 4, wherein the first data transmission port of the data transmission control module comprises a first data port of the USB control unit, a first data port of the mode control unit, and a first data port of the mode conversion unit.

6. The port extension apparatus as described in claim 5, wherein the second data transmission port of the data transmission control module is a second data port of the USB control unit.

7. The port extension apparatus as described in claim 6, wherein a third data port of the USB control unit connects to a second data port of the mode control unit and a third data port of the mode control unit connects to a second data port of the mode conversion unit.

8. The port extension apparatus as described in claim 7, wherein the third data transmission port of the data transmission module is a third data port of the mode conversion unit.

9. The port extension apparatus as described in claim 8, wherein a fourth data port of the USB control unit connects to a first data port of the USB conversion unit.

10. The port extension apparatus as described in claim 9, wherein is the fourth data transmission port of the data transmission control module is a second data port of the USB conversion unit.

11. The port extension apparatus as described in claim 10, wherein a fifth data port of the USB control unit connects to one of at least one data transmission port of the memory card conversion unit.

12. The port extension apparatus as described in claim 11, wherein the at least one data read/write port of the data transmission control module comprise the at least one data transmission port of the memory card conversion unit.

13. The port extension apparatus as described in claim 2, wherein the video port module comprises a VGA (Video Graphics Array) port, a DVI (Digital Visual Interface) port, an HDMI (High-Definition Multimedia Interface) port, a Mini DP (Mini Display Port) or a DP (Display Port).

14. The port extension apparatus as described in claim 2, wherein the first data port module comprises a Type-C female port or a Lighting female port.

15. The port extension apparatus as described in claim 2, wherein the second data port module comprises a USB (Universal Serial Bus) female port.

16. The port extension apparatus as described in claim 2, wherein the third data port module comprises a Type-C female port or a Lighting female port.

17. The port extension apparatus as described in claim 2, wherein the first port unit comprises a Type-C male port or a USB male port and the second port unit comprises a Type-C male port or a USB male port.

* * * * *

(12) INTER PARTES REVIEW CERTIFICATE (3898th)

United States Patent
Liao

(10) Number: US 10,572,429 K1
(45) Certificate Issued: Feb. 26, 2025

(54) PORT EXTENSION APPARATUS

(71) Applicant: Zhuowen Liao

(72) Inventor: Zhuowen Liao

(73) Assignee: TARGUS INTERNATIONAL LLC

Trial Number:

IPR2021-00886 filed Apr. 30, 2021

Inter Partes Review Certificate for:

Patent No.: 10,572,429
Issued: Feb. 25, 2020
Appl. No.: 15/938,055
Filed: Mar. 28, 2018

The results of IPR2021-00886 are reflected in this inter partes review certificate under 35 U.S.C. 318(b).

INTER PARTES REVIEW CERTIFICATE
U.S. Patent 10,572,429 K1
Trial No. IPR2021-00886
Certificate Issued Feb. 26, 2025

AS A RESULT OF THE INTER PARTES REVIEW PROCEEDING, IT HAS BEEN DETERMINED THAT:

Claims 1-6 and 13-17 are cancelled.

\* \* \* \* \*